July 24, 1923.
J. H. RAND
INDEX DEVICE
Filed May 26, 1921
1,462,822
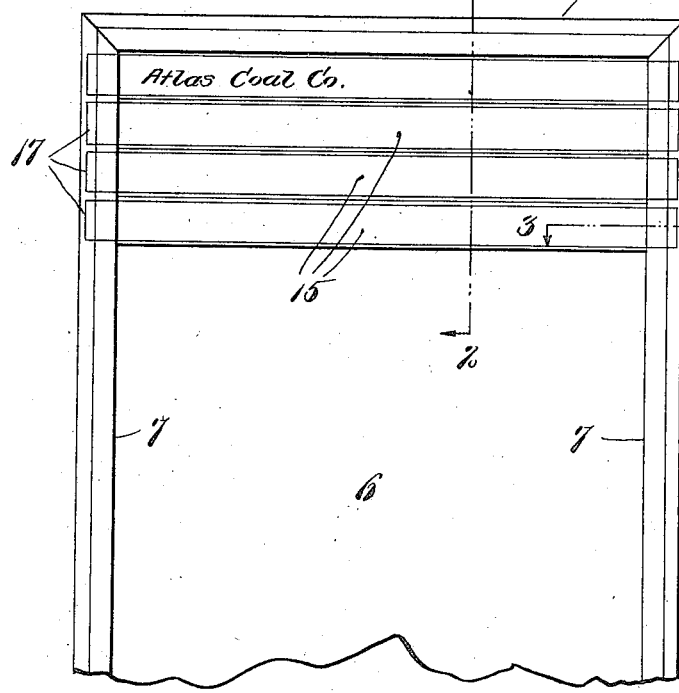
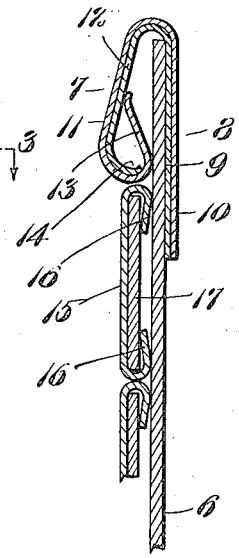
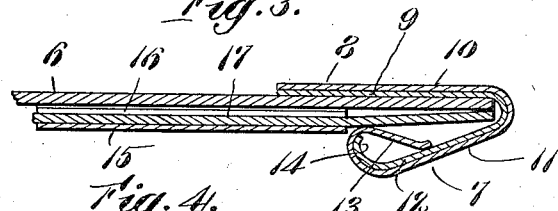
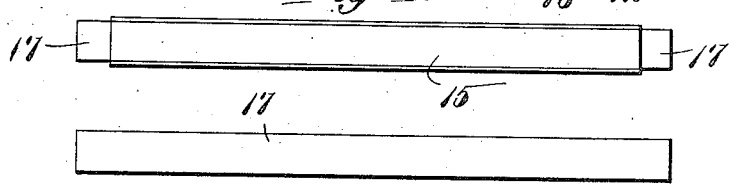
Inventor:
James H. Rand
by Roberts, Roberts & Cushman
Attys.

Patented July 24, 1923.

1,462,822

UNITED STATES PATENT OFFICE.

JAMES H. RAND, OF NORTH TONAWANDA, NEW YORK.

INDEX DEVICE.

Application filed May 26, 1921. Serial No. 472,726.

*To all whom it may concern:*

Be it known that I, JAMES H. RAND, citizen of the United States of America, and resident of North Tonawanda, in the county of Niagara and State of New York, have invented new and useful Improvements in Index Devices, of which the following is a specification.

This invention relates to index devices, and particularly to indexes of the so-called visible index type.

One of its principal objects is to provide a novel and improved form of spring retaining flange adapted to exert a more firm and positive grip on the index elements held thereby than has heretofore been possible, without using unduly stiff material or appreciably increasing the bulk of the device.

Another object is to provide a novel form of protected index element comprising a sheath and a removable index strip for displaying the index characters, so related to each other and to the frame that the sheath does not extend under the frame flanges but lies wholly between the flanges, while the uncovered ends of the index strip extend under the flanges, thus reducing the thickness or bulk of the index device and facilitating the insertion, removal and adjustment of the index elements in the frame, without sacrificing the protective features, or the interchangeability of parts, of indexes of this general character as heretofore constructed.

In the accompanying drawings which illustrate a preferred embodiment of the invention—

Fig. 1 is a front elevation of a part of an assembled index device containing the invention;

Fig. 2 is a cross section, on an enlarged scale, on line 2—2 of Fig. 1;

Fig. 3 is a cross section, on an enlarged scale, on line 3—3 of Fig. 1;

Fig. 4 is a front elevation of one of the index elements; and

Fig. 5 is a front elevation of one of the index strips removed from its sheath.

The frame consists of a flat back 6, which may be of fibre board, sheet metal or other suitable material, and spring, marginal retaining flanges. Each flange is made of a number of independent layers or leaves, preferably two leaves, of flexible, resilient, sheet material, such as sheet celluloid, folded to form a front flange member 7 and a rear flap member 8, of multiple construction. The inner layer or leaf 9 of the rear flap member is fastened by cement or in some other suitable way directly to the rear side of the back 6, while the outer layer or leaf 10 of the flap member is unattached. The free margin of one of said leaves, as the outer leaf 11, of the flange member is bent or folded around the free edge of the other leaf, as the inner leaf 12, of the flange member, as shown at 13, to shield the free edge of the other leaf from contacting with the index element when the latter is being inserted under the flange, and to form with the back 6 converging entrance walls for the easy insertion of the index elements.

The inwardly folded margin 13 also forms a lock by which the outer leaf as a whole is secured to the inner leaf, the two parts being assembled by telescoping or sliding the inner leaf endwise into the outer leaf. The free edge of the inner leaf of the flange member is preferably bent or curved a little as shown at 14 so as to make a close fit and lie in close engagement with the curve of the infolded margin 13. The two ply retaining flange 7 thus formed constitutes in effect a two-leaf spring which normally presses yieldingly and with considerable force toward and against the frame back 6, but with greater flexibility than a single ply flange of corresponding thickness.

Arranged transversely of the frame are a series of index elements, each comprising a sheath of flexible, transparent, resilient material, such as sheet celluloid, folded to form a closed front face 15 and two strip retaining lips 16, 16. The sheaths terminate short of the retaining flanges 7 at both ends and preferably are of such length as just to fill the space between the flanges, thus producing an index device which, when fully assembled, presents a practically continuous front surface of sheet celluloid. In each sheath is removably mounted an index strip 17 of paper, cardboard or other suitable sheet material, which projects at both ends beyond the ends of the sheath, and the projecting ends of the index strips extend under said spring frame flanges 7, thereby holding the index elements removably and adjustably in the frame.

I claim:—

1. An index device having a back, and a spring flange attached to the back adapted yieldingly to grip a removable index element inserted under the flange, said flange comprising a plurality of independent telescoping leaves of flexible resilient sheet material, closely fitting and contacting with one another throughout substantially their entire area.

2. An index device having a back, and a spring flange attached to the back adapted yieldingly to grip a removable index element inserted under said flange, said flange comprising a plurality of independent leaves of flexible, resilient, sheet material, the free margin of one of said leaves being bent to cover and shield the free edge of the other leaf from contacting with the index element when the latter is being inserted under the flange, and to form with the back converging entrance walls for the easy insertion of the index element.

3. An index device having a back, and a marginal flange attached to the back comprising a plurality of independent leaves of flexible, resilient, sheet material, the free margin of the outer leaf being folded around the free edge of the inner leaf.

4. An index device having a back, and a marginal flange attached to the back comprising two independent leaves of flexible, resilient, sheet material, the free margin of the outer leaf being folded around the free edge of the inner leaf.

5. An index device having a back, and a marginal flange attached to the back comprising a plurality of independent leaves of flexible, resilient, sheet material folded to form a rear flap member which is fastened to the rear side of the back, and a front flange member, the free margin of one leaf of the flange member being folded around the free edge of the other leaf of the flange member.

6. An index device having a back, and a marginal flange attached to the back comprising a plurality of independent leaves of flexible, resilient, sheet material, folded to form a rear flap member, and a front flange member, the inner leaf of the flap member being fastened to the rear side of the back while the outer leaf of the flap member is unattached, and the free margin of the outer leaf of the flange member being inwardly folded around the free edge of the inner leaf of the flange member.

7. An index comprising a frame having a back and side retaining flanges, and a series of transverse index elements each comprising a sheath terminating at each end short of the frame flanges and an index strip removably mounted in said sheath and projecting at both ends beyond the ends of the sheath, the projecting ends of the index strip extending under said frame flanges by which the index element is removably and adjustably held in the frame.

8. An index comprising a frame having a back and side retaining flanges, of flexible, resilient, sheet material normally pressing toward said back, and a series of transverse index elements each comprising a sheath of flexible, transparent, resilient, sheet material, terminating at each end short of the frame flanges and an index strip removably mounted in said sheath and projecting at both ends beyond the ends of the sheath, the projecting ends of the index strip extending under said frame flanges by which the index element is removably and adjustably held in the frame.

Signed by me at Boston, Massachusetts, this twenty-fourth day of May, 1921.

JAMES H. RAND.